US012077258B2

United States Patent
Na et al.

(10) Patent No.: US 12,077,258 B2
(45) Date of Patent: Sep. 3, 2024

(54) MULTIFUNCTIONAL SHIP FOR COLLECTING AND RECYCLING OCEAN WASTE AND MANAGEMENT SYSTEM THEREOF

(71) Applicant: WASTE ENERGY SOLUTION CO., LTD, Mokpo-si (KR)

(72) Inventors: Sung Yong Na, Seoul (KR); Byoun Hyun Chu, Pyeongtaek-si (KR); Hong Kim, Yongin-si (KR); Jang Jin Bak, Gwangju (KR)

(73) Assignee: WASTE ENERGY SOLUTION CO., LTD, Mokpo-si (KR)

( * ) Notice: Subject to any disclaimer, the term of this patent is extended or adjusted under 35 U.S.C. 154(b) by 7 days.

(21) Appl. No.: 17/604,243

(22) PCT Filed: Jun. 19, 2020

(86) PCT No.: PCT/KR2020/007963
§ 371 (c)(1),
(2) Date: Oct. 15, 2021

(87) PCT Pub. No.: WO2020/262887
PCT Pub. Date: Dec. 30, 2020

(65) Prior Publication Data
US 2022/0177082 A1 Jun. 9, 2022

(30) Foreign Application Priority Data
Jun. 27, 2019 (KR) .......... 10-2019-0077108

(51) Int. Cl.
*B63B 35/32* (2006.01)
*B27L 11/00* (2006.01)
(Continued)

(52) U.S. Cl.
CPC .............. *B63B 35/32* (2013.01); *B27L 11/00* (2013.01); *B63B 25/08* (2013.01); *B63B 27/10* (2013.01);
(Continued)

(58) Field of Classification Search
CPC ......... B63B 35/32; B63B 25/08; B63B 27/10; B63B 27/22; B63B 79/15; B63B 17/00;
(Continued)

(56) References Cited

U.S. PATENT DOCUMENTS 5,019,310 A * 5/1991 Kobayashi .............. B29B 7/489
264/141
6,178,899 B1 * 1/2001 Kaneko ................... F23G 5/006
110/235
(Continued)

FOREIGN PATENT DOCUMENTS

CN  102153216 A  *  8/2011
CN  103287549 A  *  9/2013
(Continued)

OTHER PUBLICATIONS

English Translation of Unger Publication DE102012100897, published Feb. 14, 2013. (Year: 2013).*

*Primary Examiner* — Joseph W Drodge
(74) *Attorney, Agent, or Firm* — Goldilocks Zone IP Law (57) ABSTRACT

A multifunctional ship for the collection and recycling of ocean debris and the system thereof may include a hull; a detection device provided on the hull to detect ocean debris floating on the sea or deposited on the seabed; a collection device installed on the hull to collect the ocean debris detected by the detection device; a sorting device installed on the hull to sort the ocean debris collected by the collection device; a compressing device installed on the hull to compress the sorted ocean debris to compress and remove
(Continued)

moisture and reduce the volume; a waste plastic recycling device installed on the hull to produce recycled oil by thermally decomposing the waste plastic compressed in the compressing device; a storage tank installed at the bottom of the hull to store the recycled oil produced; and a purifier for purifying wastewater generated in the process of producing recycled oil.

12 Claims, 9 Drawing Sheets (51) Int. Cl.
| | |
|---|---|
| *B63B 25/08* | (2006.01) |
| *B63B 27/10* | (2006.01) |
| *B63B 27/22* | (2006.01) |
| *B63B 79/15* | (2020.01) |
| *B63J 4/00* | (2006.01) |
| *C10G 1/00* | (2006.01) |
| *C10G 1/10* | (2006.01) |
| *E02B 15/10* | (2006.01) |
| *G05D 1/00* | (2006.01) |
| *G05D 1/02* | (2020.01) |
| *G06V 20/05* | (2022.01) |
| *B29B 17/00* | (2006.01) |
| *B29B 17/04* | (2006.01) |

(52) U.S. Cl.
CPC .............. *B63B 27/22* (2013.01); *B63B 79/15* (2020.01); *B63J 4/006* (2013.01); *C10G 1/002* (2013.01); *C10G 1/10* (2013.01); *E02B 15/10* (2013.01); *E02B 15/104* (2013.01); *G05D 1/0206* (2013.01); *G06V 20/05* (2022.01); *B29B 2017/0094* (2013.01); *B29B 2017/0496* (2013.01); *C10G 2300/1003* (2013.01); *C10G 2300/4068* (2013.01)

(58) Field of Classification Search
CPC ......... B63B 27/24; B63B 49/00; B27L 11/00; B63J 4/006; B63J 3/04; B63J 2003/002; C10G 1/002; C10G 1/10; C10G 2300/1003; C10G 2300/4068; E02B 15/10; E02B 15/104; E02B 15/04; E02B 15/046; E02B 15/047; E02B 15/048; E02B 15/106; G05D 1/0206; G06V 20/05; B29B 2017/0094; B29B 2017/0496; B29B 2017/0224; B29B 2017/0234; B29B 2017/0237; B29B 17/04; B29B 17/02; H04N 23/57; H04N 23/00; Y02W 30/52; Y02W 30/62; Y02T 70/00; C02F 1/008; C02F 2103/007; C02F 2103/08
USPC ... 210/143, 747.5, 747.6, 776, 242.1, 242.3, 210/170.05, 170.09, 170.11, 923; 264/37.1, 37.29
See application file for complete search history.

(56) References Cited

U.S. PATENT DOCUMENTS

| | | | | |
|---|---|---|---|---|
| 2004/0073221 | A1* | 4/2004 | Biscup | A61N 1/205 606/301 |
| 2011/0240456 | A1* | 10/2011 | Kim | C10B 53/00 202/100 |
| 2016/0023724 | A1* | 1/2016 | Menard | B63B 27/36 114/61.1 |
| 2017/0291668 | A1 | 10/2017 | Siewert | |
| 2017/0362406 | A1* | 12/2017 | Li | C08J 5/043 |
| 2022/0228068 | A1* | 7/2022 | Jeong | F27D 3/0032 |

FOREIGN PATENT DOCUMENTS

| | | | | |
|---|---|---|---|---|
| DE | 10201200897 | A1 * | 2/2013 | ............ C10G 1/10 |
| EP | 2634080 | A1 * | 9/2013 | |
| KR | 10-0481168 | B1 | 4/2005 | |
| KR | 100820868 | B1 * | 4/2008 | |
| KR | 100923030 | B1 * | 10/2009 | |
| KR | 10-1017457 | B1 | 2/2011 | |
| KR | 20110061876 | A * | 6/2011 | |
| KR | 10-2012-0079191 | A | 7/2012 | |
| KR | 10-2015-0119993 | A | 10/2015 | |
| KR | 10-1655650 | B1 | 9/2016 | |
| KR | 20170097988 | A * | 8/2017 | |
| KR | 101910750 | B1 * | 10/2018 | |

* cited by examiner

MULTIFUNCTIONAL SHIP FOR COLLECTING AND RECYCLING OCEAN WASTE AND MANAGEMENT SYSTEM THEREOF

CROSS-REFERENCE TO RELATED APPLICATIONS

This application claims the benefit under 35 U.S.C. section 371, of PCT International Application No.: PCT/KR2020/007963, filed on Jun. 19, 2020, which claims foreign priority to Korean Patent Application No.: 10-2019-0077108, filed on Jun. 27, 2019, in the Korean Intellectual Property Office, the disclosures of which are hereby incorporated by reference in their entireties

STATEMENT REGARDING FEDERALLY SPONSORED RESEARCH OR DEVELOPMENT (Not Applicable)

THE NAMES OF THE PARTIES TO A JOINT RESEARCH AGREEMENT (Not Applicable)

INCORPORATION-BY-REFERENCE OF MATERIAL SUBMITTED ON A READ-ONLY (Not Applicable)

OPTICAL DISC, AS A TEXT FILE OR AN XML FILE VIA THE PATENT ELECTRONIC SYSTEM (Not Applicable)

STATEMENT REGARDING PRIOR DISCLOSURES BY THE INVENTOR OR A JOINT INVENTOR. (Not Applicable)

BACKGROUND OF THE INVENTION

Field of the Invention

The present invention detects ocean, i.e., marine, debris in the hull, collects and selects, and pyrolysis of the selected waste plastic to produce recycled oil, and facilities capable of generating electricity are provided both in the ship, solving environmental problems, and to recycle resources it relates to a multifunctional ship and its management system.

Background of the Invention

The ocean, which covers about 70% of the earth's surface, is a treasure trove of all kinds of creatures and a source of mineral resources.

However, oil pollution accidents that are occurring frequently with industrial development, chemical and radioactive materials, etc. are adversely affecting the ocean ecosystem, in addition to recently, plastic waste flowing from the land, fishing nets made of plastic, ocean ecosystem pollution due to fishing gears such as a situation that is emerging as a new environmental problem. In particular, plastic products are difficult to decompose in nature, when incinerated, because it can cause very harmful substances to the human body, such as dioxins require special attention to post-use treatment.

An ocean debris such as plastic, waste vinyl, buoys, fishing gears, and waste tires of the waste net, which are made of Polypropylene (PP), polyethylene (PE), polystyrene (PS), is dumped or lost in the sea while drifting over a long time while drifting at sea gives a lot of damage to ocean life.

In addition, it flows into the beach, destroying the coastal environment and harming the coastal landscape.

In addition, among these ocean debris, such as fishing nets or fishing gears, garbage deposited on the seabed has been the main cause of destroying the ocean ecosystem by damaging the habitat and fishing grounds of ocean life.

When the ocean pollution problem caused by ocean debris such as plastic reaches a serious level, the United States, Japan, Europe, etc. are investigating the density and damage state of the plastic distributed in their own coastal and near-sea waters, environmental groups of multiple countries are making a lot of effort to collect ocean and undersea debris, i.e., garbage.

Conventional collection process for such ocean debris is transported by collecting ocean debris, and stored in a storage facility on land, because the processing is made through the final screening process in the collection process secondary, tertiary environmental problems have been generated.

Accordingly, recently, the Republic of Korea Patent No. 10-0481168, published on Mar. 25, 2005, discloses a ship capable of collecting ocean debris for the purpose of seabed purification of the coast or offshore, such as a multifunctional ocean debris collection ship equipped with a residual debris collecting device is proposed.

However, the related art described above is to collect ocean debris and crush it or reduce the volume to transport to land, the transported ocean debris is loaded on the shore has provided another cause of environmental pollution.

Moreover, as ocean debris is immersed in seawater, moisture is absorbed and the weight increases, and since salt permeates, there is a problem of secondary environmental pollution caused by dioxins emitted during incineration of ocean debris.

BRIEF DESCRIPTION OF THE INVENTION

Technical Problem to be Solved

Aspects of the present invention can solve the secondary and tertiary environmental problems caused by transferring ocean debris to land by batching ocean debris.

Waste generated during the treatment process is not discharged into the ocean, and ocean debris detected by detection devices installed in the ship are collected and sorted.

Among the selected ocean debris, a waste plastic can be pyrolysis to produce recycled oil, and garbage disposal can be made in the ship to solve the environmental and cost problems that may arise during the transportation process for the treatment of ocean debris.

Resources can be reused through recycling, and information from each traffic control unit of multiple ships is collected, analyzed and processed, and the analyzed and processed information is sent to the operator's portable monitoring terminal for immediate use in work, and the purpose is to manage and control a large number of ships to enable the production of large amount of recycled oil.

Means for Solving Problems

According to aspect of the present invention, a multifunctional ship for ocean debris collective collection and recycling treatment may include a hull, a detector provided in the hull to detect ocean debris floating on the sea or deposited on the seabed during anchoring or sailing of the hull; a collecting device installed in the hull to collect the ocean debris detected by the detector to the hull; a sorting device installed in the hull to sort the ocean debris collected by the collection device by a characteristic; a compressing device installed in the hull to compress the ocean debris selected in the sorting device to remove moisture and reduce the volume; the waste plastic compressed in the compressing device is put into the pyrolysis furnace through the input pipe and pyrolyzed to discharge the oil vapor and sludge through the gas output pipe and the sludge discharge pipe, respectively, a waste plastic recycling device installed in the hull to produce recycled oil; a storage tank installed at a bottom of the hull to store the recycled oil produced by the waste plastic recycling device; and a purifying device that purifies wastewater generated in the process of producing recycled oil so that it can be reused.

Effects of the Invention

According to an aspect of the present invention, it is possible to solve the secondary and tertiary environmental problems generated while transporting ocean debris to land by batch processing ocean debris, and does not discharge waste generated in the process of treatment to the ocean, collecting and sorting the ocean debris detected by the detecting device, producing recycled oil by thermally decomposing waste plastics among the selected ocean debris, and the waste is processed in the ship to solve the environmental and cost problems that may occur in the transportation process for the treatment of ocean debris. Thus, resources can be reused through recycling.

Information from each traffic control unit of a number of ships is collected, analyzed, and processed, and the analyzed and processed information is sent to the operator's portable monitoring terminal so that it can be used immediately for work. By managing and controlling a number of ships, it has the effect of producing a large amount of recycled oil.

In addition, the ship according to the present invention enables a compact design of a small continuous pyrolysis emulsification device and reduces costs, and a plurality of screws are partially overlapped inside the input pipe and an air inlet prevention plate is installed, so that the input amount of waste plastic is well controlled.

Furthermore, the inflow of oxygen is blocked, and by press-injecting the waste plastic into the pyrolysis furnace, smooth transfer and input are possible without stagnation, and waste input efficiency is increased, productivity, yield and economic feasibility are increased, and maintenance and repair are easy.

In addition, the ship according to the present invention can obtain high-quality refined oil by pushing and blocking foreign substances such as carbon, dust, ash, and sludge flowing into the gas output pipe into the pyrolysis furnace and prevents foreign substances or sludge from sticking to the inside of the pipe and clogging the pipe. As a result, maintenance and repair are easy, productivity, yield, and economy are increased, and the emission of pollutants is reduced according to aspect(s) of the present invention.

DESCRIPTION OF THE EMBODIMENT

The ship according to the present invention detects ocean debris L dumped at sea and on the seabed, collect and select detected ocean debris L and pyrotheres waste plastics from selected ocean debris L to produce recycled oil, by shredding waste wood from selected ocean debris L to produce wood chips, and by sorting and selecting, and recycling garbage in ships, environmental and cost problems arising during the transportation process for the treatment of ocean debris L can be eliminated.

There is an advantage in being able to recycle resources through the recycling of the ocean debris.

Figure 2:
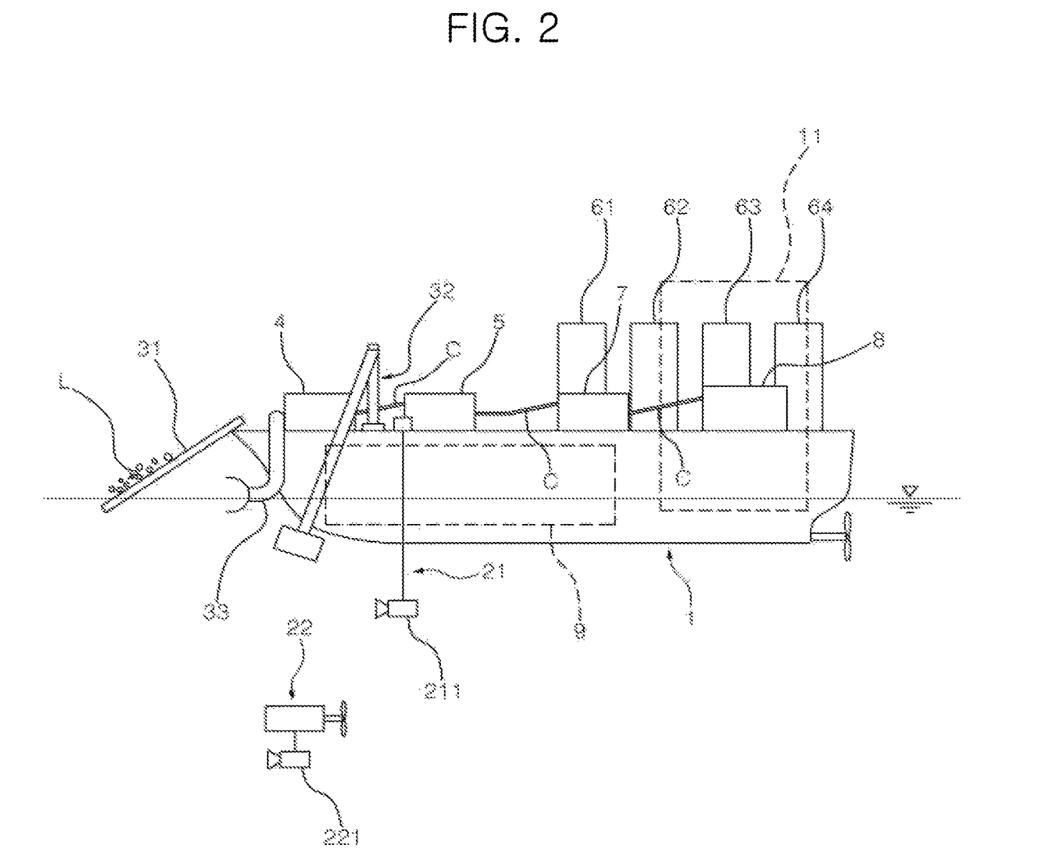
FIG. 2 is a side view conceptually showing the ship according to an embodiment of the present invention.
Figure 3:
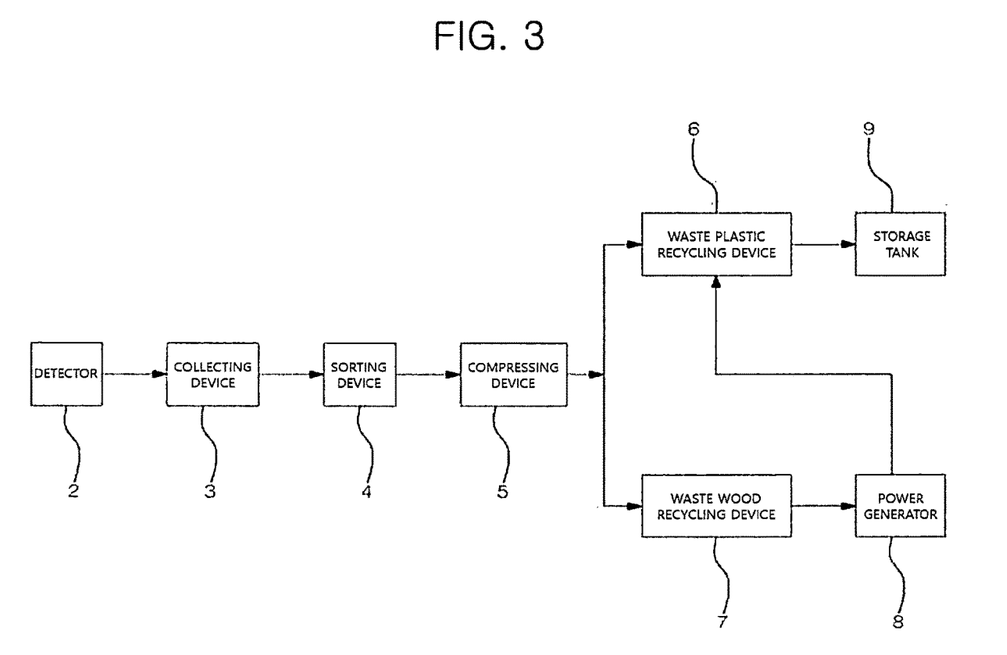
FIG. 3 is a block diagram showing an arrangement for the composition of the ship according to an embodiment of the present invention.

Referring to FIGS. 2 and 3, multifunction ships for ocean debris collecting and regenerating processing according to the present invention may include a hull 1, a detector 2, a collecting device 3, a sorting device 4, a compressing device 5, a waste plastic recycling device 6, a waste wood recycling device 7, a power generator 8, a storage tank 9, and some or all of the purification device, At this time, a conveyor C for the transfer of ocean debris L may be installed between these devices in the process of ocean debris being collected and regenerated.

The hull 1 may be anchored to the sea or be able to sail to the sea.

The hull may include devices for collecting, processing, and recycling the ocean debris L.

In addition, the hull 1 may include a navigation and traffic control device 11 for navigating and traffic controlling of the ship, the navigation and traffic control device 11 may include an engine, a steering device for a self-navigation.

Furthermore, a traffic control apparatus M1, M2 . . . Mn for detecting the ocean debris L, collecting the detected ocean debris L, monitoring, and managing process of collecting, and screening the detected ocean debris may be provided.

The traffic control apparatus may manage the overall collecting and processing of the ocean debris L while communicating with an external traffic control device S provided outside the hull 1 such as land, and more details will be described later.

The detector 2 may include a camera, is installed in the hull 1, to detect the floating or deposited ocean debris L in the ocean.

The detector 2 may detect sea, in the water or seabed by photographing with the camera(s) 211, 221, to obtain the image information, and thus by analyzing the acquired image information to determine an amount and a location of the ocean debris L is provided to the traffic control device to be monitored by the administrator.

The navigation and traffic control device 11 may move the hull to a target location for collecting the ocean debris L based on a location information detected by the detector 2, and then collect the ocean debris L of the target location using a collecting device 3.

The detector 2 for obtaining the location information of ocean debris L may be provided with a GPS sensor.

The camera provided in the detector 2 may be installed on a board to photograph the sea.

As shown in FIG. 2, the camera 211 may be put into the water to photograph the underwater or the seabed, the detector 2 provided with the camera 211 is put into the water by the dropping device 21 provided with the hull.

For example, the dropping device 21 may include a rope that is winded and loosened by a winch, and the camera 211 may be suspended on the rope and put into the water.

Another example, the dropping device may include a robot arm with a link, which can be operated to bring the camera underwater. However, it is understood that it is not limited thereto.

For example, the dropping device 21 may include a rope winding and loosening by a winch for the camera hanging on the rope, putting into the water, the camera 211 may be put into the water hanging on the rope consisting of a rope winding and loosening the winch, the robot arm is configured to operate the robot arm is connected to the link member may be added to the camera in the water, in addition to these it may be configured by various means.

In another embodiment, FIG. 2 shows an underwater drone 22 that is controlled by the control device provided in hull 1. The detector 2 may include the underwater drone 22 with a camera 221, The underwater drone 22 included in the detector 2 is put into the water for the camera 221 to photograph the water or seabed.

The camera 221 may take an image in water and transmit the photographed image information to the traffic control device wirelessly or wired.

At this time, the underwater drone 22 may be provided with a GPS sensor for obtaining location information.

Figure 1:
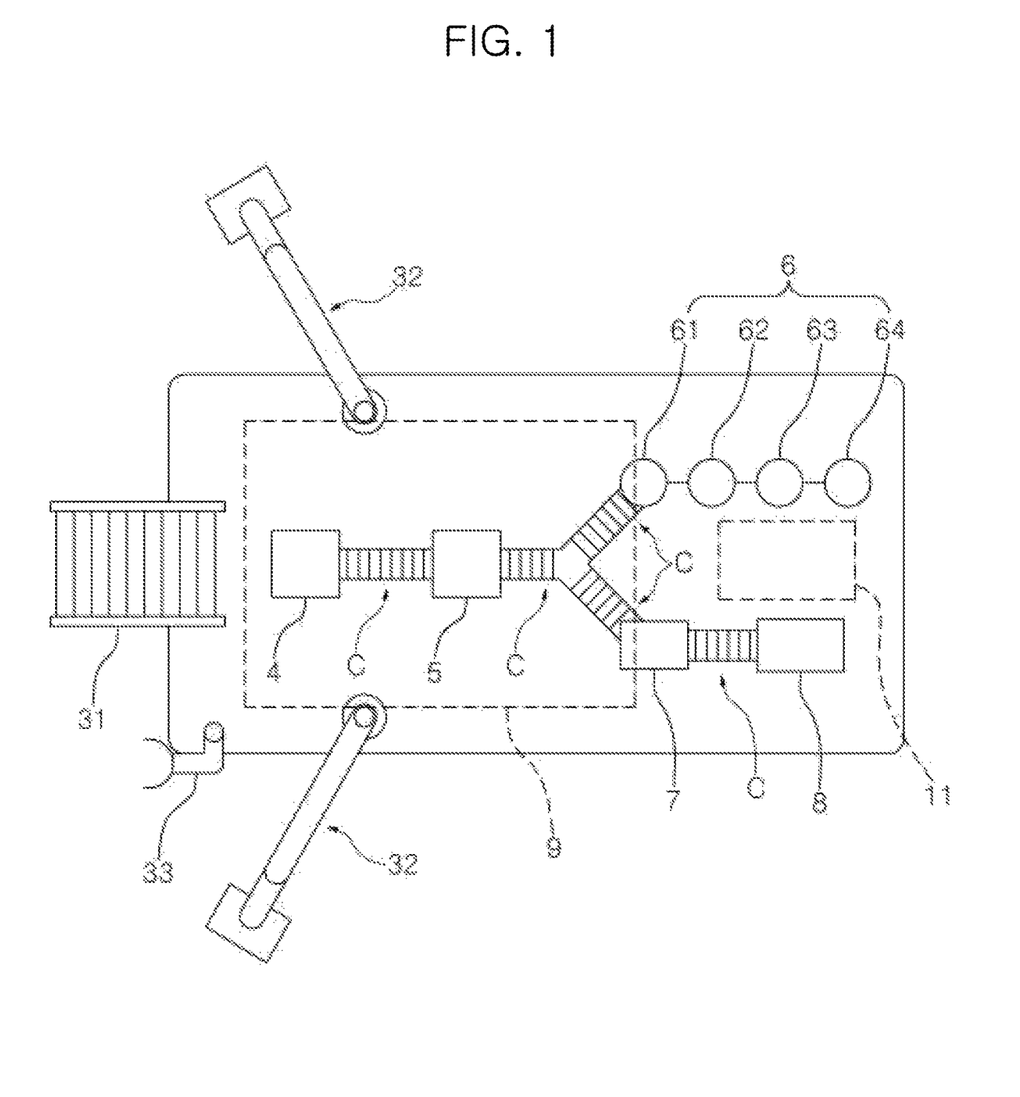
FIG. 1 is a floor plan conceptually showing the ship according to an embodiment of the present invention.

Referring to FIGS. 1 and 2, the collecting device 3 is to collect the ocean debris L that is floated at the sea or deposited to the seabed into hull 1 during anchoring or sailing of hull 1 and may include a collecting conveyor 31, which is installed at the front of hull 1, a collecting crane 32, which is installed on both sides of hull 1 and can extend a clamp or a bucket down the hull 1, and an inhaler 33 disposed at the front or side of the hull 1 to inhale a floated ocean debris L and to discharge it on a board of the hull 1.

The collecting conveyor 31 is installed obliquely between the sea and the ship to pick up the ocean debris L floated in the sea or water above the hull, the front is underwater, and the rear is installed over a lead of the hull 1.

The ocean debris L is collected in front of the collecting conveyor 31 by the progress of the hull 1 or the flow of a sea current or a tidal current, and the collected ocean debris L is transported upward along the collecting conveyor 31, and then dropped on the board or transferred to a sorting device 4 installed on the hull 1.

The collecting conveyor 31 may be provided with a weight weigher (not shown) to measure an amount of the collected ocean debris L for automatically inputting to a subsequent process.

Referring to FIGS. 1 and 2, The collecting crane 32 installed on both sides of the hull 1, using a clamp or bucket provided at the tip of the arm, to pick up or scoop out ocean debris L floated in the sea, water or deposited on the seabed.

The collecting crane 32 is used for the operation of lifting the ocean debris L, as well as picking up the ocean debris L dropped on board by the collection conveyor 31 or the inhaler 33 may be input to the sorting device 4 for next operation. The collecting crane 32 is preferably provided with a weight weigher (not shown) capable of weighing the ocean debris L weight to measure the amount of the collected ocean debris L.

Referring to FIGS. 1 and 2, the inhaler 33 is disposed at the head or side of the hull 1 to suck the ocean debris L floating in the sea, water or deposited on the seabed and discharge it on the hull 1. The inhaler 33 may suck the ocean debris L collected by sailing the hull 1, by sea currents, by tidal currents, at the inlet of the inhaler 33, together with seawater, and dropped onto the ship.

The sorting device 4 may select the ocean debris L collected by the collecting device 3 according to a characteristic, it is possible to select the combustible waste wood and waste plastic. The characteristic may mean a weight or specific gravity of the ocean debris. Thus, as an example, screening of these waste wood and waste plastic can be selected using a weight or specific gravity difference. By spraying pressurized air on the separated waste wood and waste plastic, waste wood and waste plastic having a weight difference are separated from each other, and metal materials can be separated using the magnetic force of a magnet according to an aspect of the present invention.

The compressing device 5 is installed in the hull 1 to be disposed in the subsequent process of the sorting device 4 to remove a water contained the ocean debris L by squeezing, configured to reduce a volume of the ocean debris L, to store the compressed waste wood or waste plastic inside the hull 1, to put the compressed waste wood into the waste wood recycling device 7, and to put the compressed waste plastic into the waste plastic recycling device 6.

The waste plastic recycling device 6 is installed in hull 1 to pyrolyze the waste plastic compressed by the sorting device 5 is selected from the sorting device 4 to produce recycled oil.

The waste plastic recycling device 6 may include an input pipe, a desalter 61, a pyrolysis furnace 62, a gas output pipe sludge discharge pipe, a fractionation steamer 63, and a purifier 64.

Waste plastics composed of polypropylene (PP), polyethylene (PE) and polystyrene (PS) components are mainly used in the recycling treatment to produce such recycled oil.

The desalter 61 may neutralize the gas containing chlorine in the decomposition gas of the waste plastic, using caustic soda or ammonia water as a neutralizer, and remove the gas such as corrosive strong hydrogen chloride in the pyrolysis process of the waste plastic accordingly.

In the pyrolysis furnace 62, the waste plastic is inputted and thermally decomposed by heating it to a temperature in the range of 250 to 500° C. by a heater and is liquefied into a low-molecular material and converted into oil vapor.

The fractionation steamer 63 may separate oil components based on temperature by condensing oil vapor evaporated from the pyrolyzed recycled oil mixed liquid, and the purifier 64 may separate moisture from the separated recycled oil and filter other components. Only pure recycled oil is separated, and the final refined recycled oil is stored in the storage tank 9 by types of the recycled oils.

A waste wood recycling device 7 may produce a wood chip by drying and crushing the compressed waste wood to use as a fuel in the compressing device 5, compressed waste wood from the compressing device 5.

Thus, the waste wood recycling device 7 is placed subsequent to the compressing device 5, for receiving the compressed waste wood, which is selected in the sorting device, from the compressing device 5.

A power generator 8 may generate electricity using a heat generated while processing the ocean debris L, the wood chip prepared in the waste wood recycling device 7 is inputted and heated, using the heat generated by the heating of such a wood chip generates steam, and rotates a turbine of the generator with the steam to produce a power.

The power generated in the power generator 8 is supplied to the waste plastic recycling device 6 for using as a power source, such as heating of the waste plastic, condensation and cooling of gas. In addition, the power may be used as a power source required for the operation of the ship and the drive of other devices.

The storage tank 9 may be installed at the bottom of the hull 1, a space in which the recycled oil prepared by the waste plastic recycling device 8 is stored.

The purification device is installed above or inside the hull for purifying and reusing the wastewater generated in the process of producing recycled oil in the waste plastic recycling device 6. Thus, it is possible to solve the environmental problem at a time because it does not discharge any waste generated in the processing process of ocean debris into the ocean.

Hereinafter, it will be described in detail for the waste plastic recycling device 6 of the present invention.

Figure 4A:
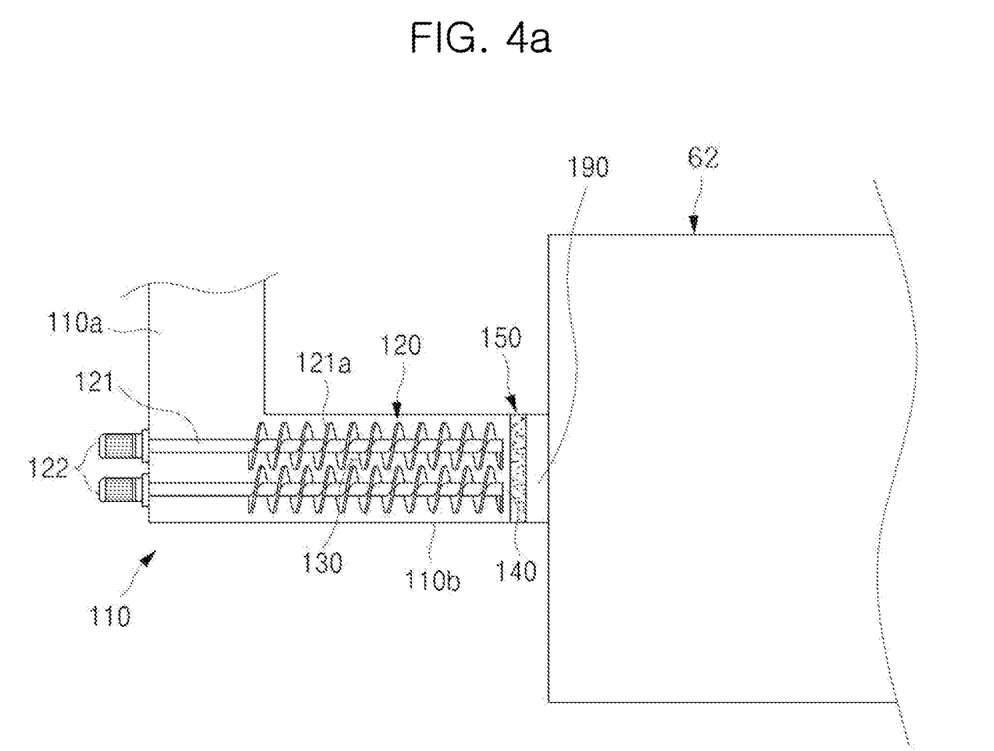
FIG. 4a is a side view showing a pyrolysis furnace with an input tube ship according to an embodiment of the present invention.
Figure 4B:
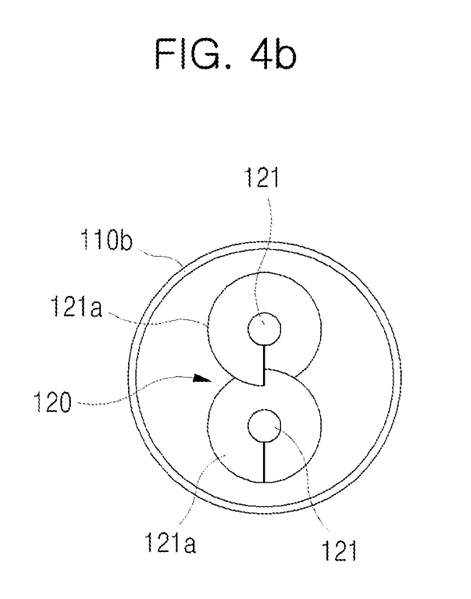
FIG. 4b is a view showing a cross section of the input tube ship according to an embodiment of the present invention.

Referring to FIGS. 4A and 4B, the pyrolysis furnace 62 is formed in a substantially cylindrical shape, is horizontally disposed and rotates by the rotational force provided by a motor 205.

A power transmitter (not shown) such as a gear or a belt may be installed between the motor 205 and the pyrolysis furnace 62.

The waste plastic is automatically continuously fed from the input pipe 110 connected to one side and heated and melted while being stirred by the rotation of the pyrolysis furnace 62. The melted waste plastic is transported toward the outlet while being guided by the spiral 210, As a result, the pyrolysis furnace 62 may have a large area heated compared to a fixed pyrolysis furnace, heat is transmitted evenly, can be manufactured in a smaller size compared to a non-rotary pyrolysis furnace, a compact design of a continuous pyrolysis emulsifier is possible, and cost is reduced according to aspects of the present invention.

At this time, a heater (not shown) may be formed below the pyrolysis furnace 62 to heat the pyrolysis furnace 62. Among the above-described configurations, the configuration and operation for rotation and heating of the pyrolysis furnace 62 are already well-known arts, and thus a detailed description thereof will be omitted.

The pyrolysis furnace 62 is installed so that the discharge pipe 300 is connected to an outlet on the other side, and a horizontal line of the gas output pipe 400 and the sludge discharge pipe 500 passes through an inside of the discharge pipe 300, so that the oil vapor gas and sludge are separated and discharged.

The input pipe 110 may receive the waste plastic to be fed into the pyrolysis furnace 62, connected to one side of the pyrolysis furnace 62, and a pair of input screws 120 inside the input pipe 110.

A pair of input screws 120 are installed side by side inside the input pipe 110 rotatably by drivers 122 to press and transport the waste plastic toward the inlet of the pyrolysis furnace 62, and the pair of input screws 120 has a slit 130 that is a narrow gap therebetween and is spaced apart so that partially overlap with each other.

The pair of input screws 120 may include a rotary shaft 121 connected to the driver 122 and rotated, and a plurality of blades 121a formed on the rotary shaft, and a wing groove is formed between the blades 121a and the blades 121a so that the blade 121a of the upper input screw is close enough to be nearly engaged with the wing groove of the lower input screw, and some of them are arranged to overlap each other.

Thus, the inflow of air such as oxygen can be minimized, and the waste plastic is compressed and transported into the pyrolysis furnace for smooth transport and input without stagnation. In addition, it is easy to control the input amount of waste plastic, and the input efficiency of waste plastic is increased.

However, the pair of input screws 120 are not in contact with each other, the slit 130 made of a narrow gap therebetween is formed.

The slit 130 is formed in a shape in which a wave shape such as "~" is repeatedly connected when viewed from the side, and waste vinyl, which is mainly thin, is compressed and transported through the slit 130, and it is preferable to be made with a narrow gap, a thickness is 2 to 10 mm.

This is because if the thickness of the slit 130 is less than 2 mm, the waste vinyl may not pass smoothly, and if the thickness of the slit 130 exceeds 10 mm, the inflow of air may increase.

The input screw 120 may be formed by coating a protective layer on a surface thereof. The protective layer may contain 10 to 20% by weight of glass fiber, 5 to 10% by weight of carbon fiber, and 5 to 10% by weight of poly meth methyl acrylate in Teflon resin.

Thus, it prevents explosion by blocking sparks that may be generated by contact between metals due to screw rotation in advance, and has excellent heat resistance and abrasion resistance, so durability can be increased.

Teflon resin, which contains 60 to 70 wt. %, forms a very stable chemical due to the strong chemical bond between fluorine and carbon, and has properties such as chemical inertness, heat resistance, non-tackiness, insulation stability, and low coefficient of friction. Thus, the Teflon resin forms the main component of the protective layer, and waste plastic is transported smoothly without sticking to the screw, preventing sparks, and increasing durability.

Glass fiber strengthens the properties of Teflon resin and increases corrosion resistance and heat insulation. If the glass fiber exceeds 20% by weight, the protective layer may be damaged by abrasion by waste, so it is preferable to contain 10 to 20% by weight.

Carbon fiber is a carbon material processed into a fibrous form, has a fibrous shape with a carbon content of 90% or more, and exhibits excellent properties especially at high temperatures.

Unlike metals, which decrease in mechanical strength at higher temperatures, mechanical strength of the carbon fiber increases as the temperature rises. The carbon fiber has a low coefficient of thermal expansion and is considered the only material that can be used up to 3,000° C. in a non-oxidizing atmosphere.

An aspect of the present invention, 5 to 10% by weight of these carbon fibers are included and are irregularly dispersed in the protective layer to function as a support for supporting the protective layer, and to increase the high-temperature characteristics of the protective layer.

Polymethyl methyl acrylate increases the strength and heat resistance of the protective layer, and stabilizes the protective layer attached to the screw due to excellent adhesion and is preferably contained in an amount of 5 to 10% by weight.

Figure 5A:
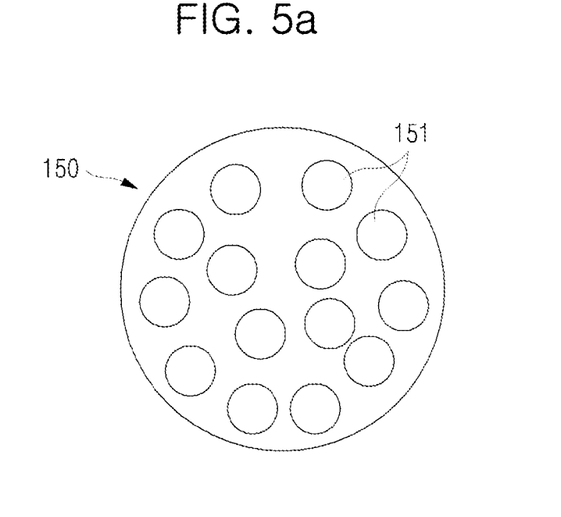
FIG. 5a and FIG. 5b is a view showing an air flow preventing plate according to an embodiment of the present invention.

Referring to FIG. 5a, an air inlet preventing plate 150 having a predetermined strength and thickness is installed in the vertical direction inside the rear end of the input pipe 110, the air inflow prevention plate 150 is formed through a plurality of input holes 151 so that the waste plastic compressed by the pair of input screws 120 can pass therethrough, blocks air from flowing into the pyrolysis furnace 62, and blocks the high heat of the pyrolysis furnace 62 from being transferred to the input pipe 110, The waste plastic is pushed through the input hole 151 in a compressed state and passed through the pyrolysis furnace 62 in a compact state without sagging or increasing in volume, and the input efficiency is increased.

Figure 5B:
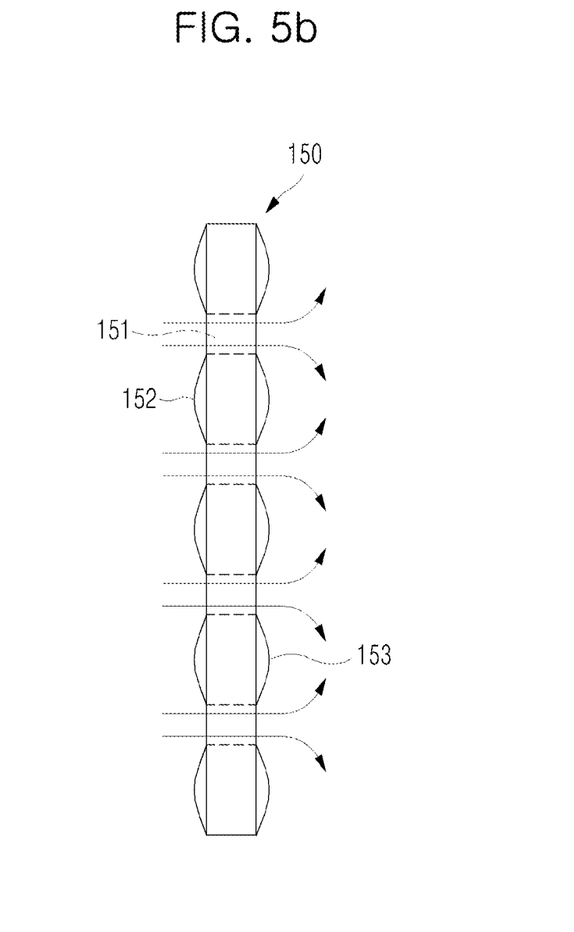

Referring to FIG. 5b, the air inflow preventing plate 150 has a front protrusion 152 formed on the front around the input hole 151 to partially buffer the pressure applied to the air inflow preventing plate 150, and it can guide the compressed waste plastic to pass through the input hole 151, a rear protrusion 153 is formed on the rear surface around the input hole 151 so that the waste plastic passing through the input hole 151 is not stagnant in a separating space 190 and can be smoothly introduced into the pyrolysis furnace 200.

The pair of input screws 120 are installed to be spaced apart from the air inflow preventing plate 150 by a predetermined gap 140, and the predetermined gap 140 is preferably 2 to 10 cm.

If the predetermined gap 140 is less than 2 cm, an excessive pressure is applied to the air inflow preventing plate 150, and the air inflow preventing plate 150 may be bent or damaged.

Since the pressure of the waste plastic is partially offset, the passage of the input hole 151 may not be smooth. If the gap 140 exceeds 10 cm, the pressure of the compressed waste plastic may be partially offset, so that the compressed waste plastic may not pass the input hole 151 smoothly.

The air inflow preventing plate 150 is installed spaced apart from the inlet of the pyrolysis furnace 62 to prevent damage due to high heat inside the pyrolysis furnace, and the separating space 190 is an empty space where the input screw 120 is not installed.

The air inflow preventing plate 150 may include a circular plate having a predetermined thickness and having a plurality of input holes 151 penetrated therethrough, a front coating layer coated on the front surface of the circular plate, and a rear coating layer coated on the rear surface of the circular plate.

The front coating layer may buffer and resist the pressure according to the compression of the waste of the input screw 120. Thus, the durability of the component may be increased.

The front coating layer may include, by weight, 25 to 40% of EVA resin, 10 to 20% of polyethersiloxane copolymer, 10 to 20% of urethane (meth)acrylate oligomer, 10 to 20% of Teflon resin, 5 to 10% of glass fiber, 2,2-Dimethyltrimethylene acrylate 1-5%, polyvinylpyrrolidone 1-5%, N-butyl methacrylate 1-5%, 2-ethylphenoxymethacrylate 1-5%, tri3-Mercaptopropionyloxyethic isocyanurate (TEMPIC) 0.5 to 2%, dipropylene glycol diacrylate 0.5 to 1.5%, bis(3-ethyl-5-methyl-4-maleimidephenyl)methane 0.5 to 1.5%, acrylic emulsion resin 0.5 to 1.5%, alkyl benzene sulfonate 0.5 to 1.5%, 3-glycidoxypropylmethyldiethoxysilane 0.5 to 1.5%.

The rear coating layer may increase the heat transfer blocking effect of the thermal decomposition furnace 62, reduce the thermal expansion of the tube, and improve durability.

The rear coating layer may include 30 to 50% by weight of polyolefin resin, 15 to 25% of urethane (meth)acrylate oligomer, 10 to 20% of Teflon resin, 5 to 10% of glass fiber, 5 to 10% of methylene diphenyl diisocyanate, toluene-2,4-diisocyanate 5 to 10%, polyvinylpyrrolidone 1 to 5%, carbonylbiscaprolactam 1 to 5%, N-butyl methacrylate 1 to 5%, tri3-mercaptopropionyl Oxyethic isocyanurate (TEMPIC) is 0.5 to 2%, Potassium silicate 0.5 to 2%, mineral fiber 0.5 to 2%, 4,4'-diaminodiphenylamine 0.5 to 2%, 1,6-hexanediol diacrylate 0.5 to 1.5%, N-[4-(2)-Benzimidazolyl)phenyl] maleimide 0.5 to 1.5%, and dibutyltin dilaurate 0.5 to 1.5%, and butyl alcohol acrylate 0.5 to 1.5%.

Figure 6A:
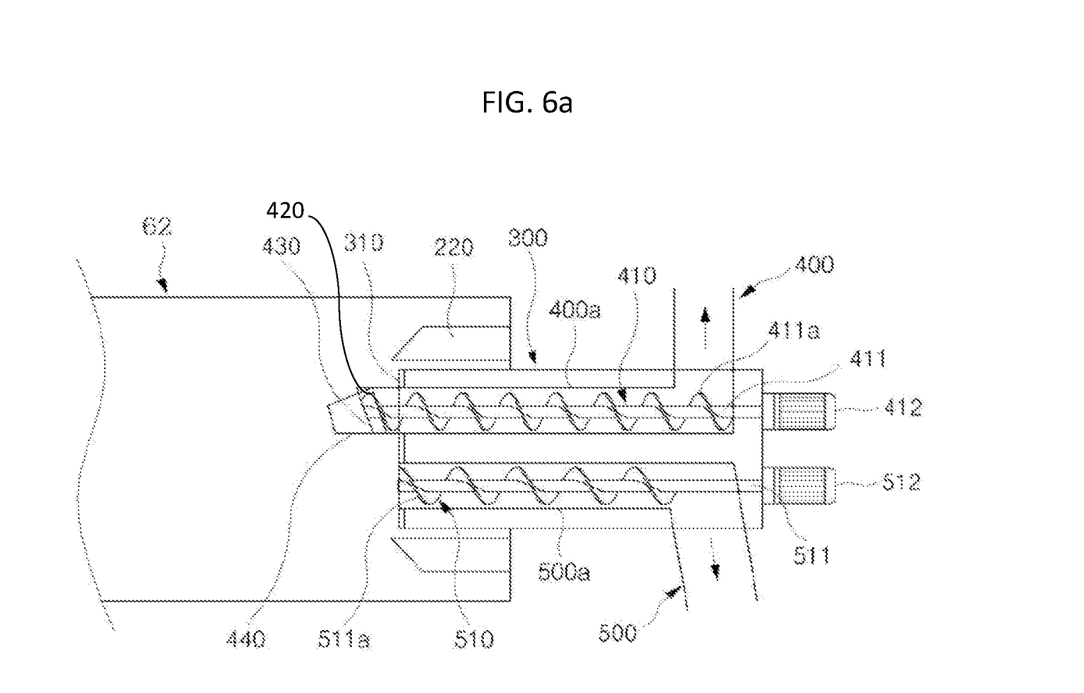
FIG. 6a is a side view showing a pyrolysis furnace and an exhaust pipe ship according to an embodiment of the present invention.
Figure 6B:
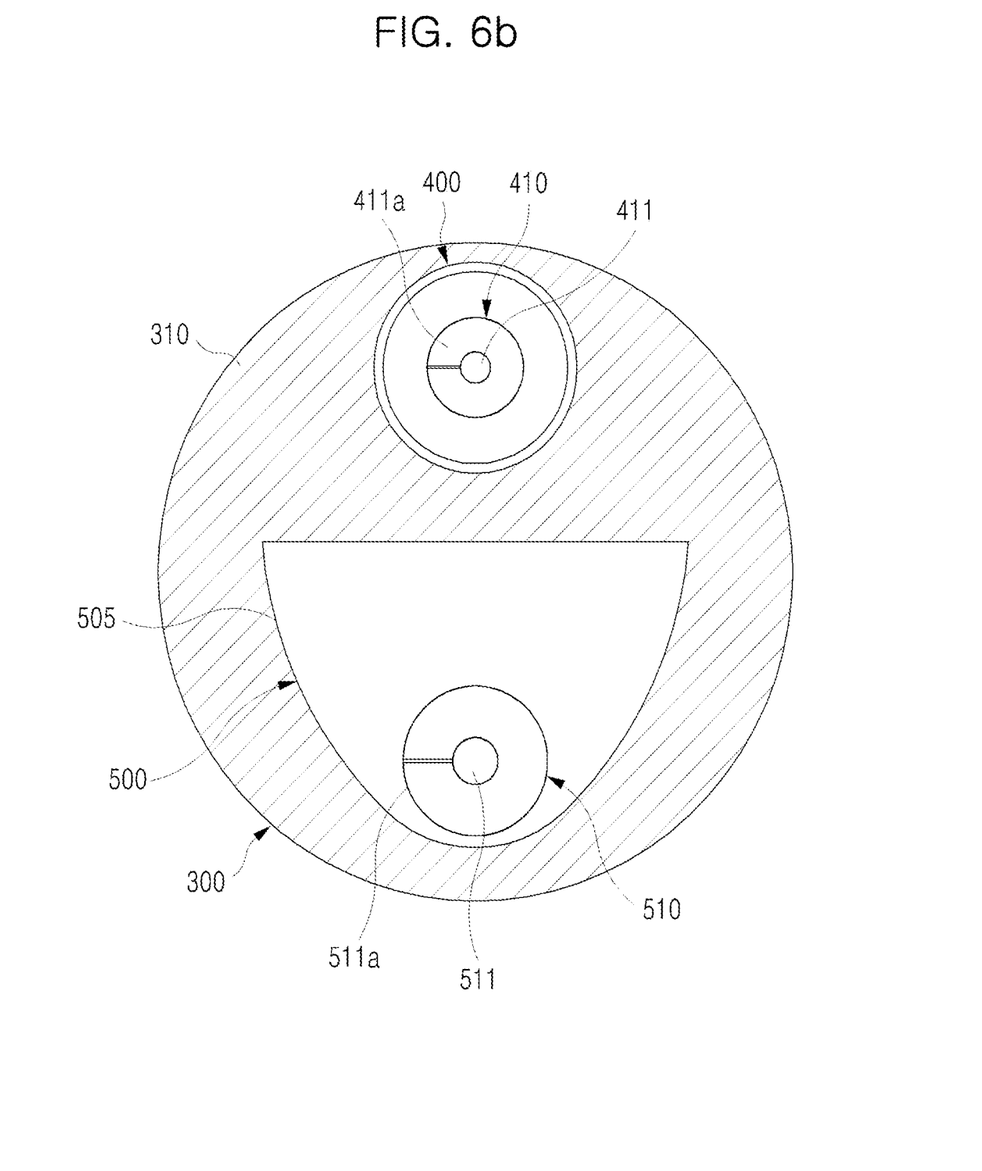
FIG. 6b is a view showing a cross section of the discharge pipe ship according to an embodiment of the present invention.

Referring to FIGS. 6a and 6b, the discharge pipe body 300 may be formed with a blocking plate 310 that closes the pipe inlet in order to block the heat of the pyrolysis furnace 62 from being directly transmitted to the gas output pipe 400 and the sludge discharge pipe 500. The blocking plate 310 has an opening so that the gas output pipe 400 and the inlet of the sludge discharge pipe 500 can communicate with the inside of the pyrolysis furnace 200.

The gas output pipe 400 may be installed so that a reverse rotation screw 410 inside the horizontal line 400a formed in a horizontal direction rotates in an opposite direction to a rotation direction of the pyrolysis furnace 200 by the driver 412.

Gas such as oil vapor generated by heating and melting in the pyrolysis furnace 62 passes, and carbon, dust, which can be introduced into the gas output pipe 400 through the pipe inlet 420 while the pyrolysis furnace 62 rotates, foreign substances such as ash and sludge are pushed toward the inside of the pyrolysis furnace 62 and blocked to obtain high-quality refined oil.

It prevents foreign substances or sludge from sticking to the inside of the pipe and thus clogging the pipe, which makes maintenance and repair easy, increases productivity, yield and economy, and can reduce the emission of pollutants.

The reverse rotating screw 410 is provided such that a blade hole 411b is formed between the blade 411a and the rotating shaft 411, so that a gas such as oil vapor can pass smoothly.

The gas output pipe 400 is formed to protrude so that a pipe inlet 420 is exposed to an outside of the discharge pipe body 300 and a part is introduced into the pyrolysis furnace 62, so that the inflow of foreign substances and sludge is minimized due to the rotation of the pyrolysis furnace 62.

In addition, the inlet 420 introduced into the pyrolysis furnace 62 has an inclined portion 430 formed so that an end of the inlet 420 is inclined downward from the upper side toward the outlet, so that the inflow of foreign substances and sludge can be further minimized.

A pipe tip 440 having a trapezoidal shape in its side cross-section is connected to the inclined portion 430 to be inclined in the downward direction, gas such as oil vapor generated by heating and melting in the pyrolysis furnace 200 is freely introduced by a natural pressure. However, an inflow of foreign substances such as carbon, dust, ash and sludge can be further minimized.

The sludge discharge pipe 500 is installed so that the forward rotation screw 510 rotates forward in the same direction as the rotation direction of the pyrolysis furnace 200 by the driver 512 inside the horizontal line 500a formed in the horizontal direction, foreign substances and sludge generated in the pyrolysis furnace 200 can be smoothly and stably discharged.

The horizontal line 500a of the sludge discharge pipe 500 is arranged in an approximately "U" shape in its front cross-section, more specifically, a curved part 505 is formed in a semi-elliptical shape erected to be located at the lower side of the sludge discharge pipe 500, the cross-sectional area can be increased, so that foreign substances and sludge can be discharged smoothly and stably.

The forward rotating screw 510 has a blade forming part 510a in which a pitch between the blades 511a is formed to be 1.5 to 3 times a pitch of the reverse rotation screw 410, and the pitch gradually increases toward the rear end so that foreign substances and sludge introduced into the inlet of the sludge discharge pipe 500 may be smoothly discharged without being caught in the middle or stagnant.

In the rear end of the horizontal line 500a in which the direction of the sludge discharge pipe 500 is changed downward, the blade 511a is not formed and a shaft portion consisting of only the rotating shaft 511 is provided, Thus, in a place where the direction of the sludge discharge pipe 500 is changed, the foreign substances and sludge are not stagnant and stable discharge is possible.

Figure 6C:
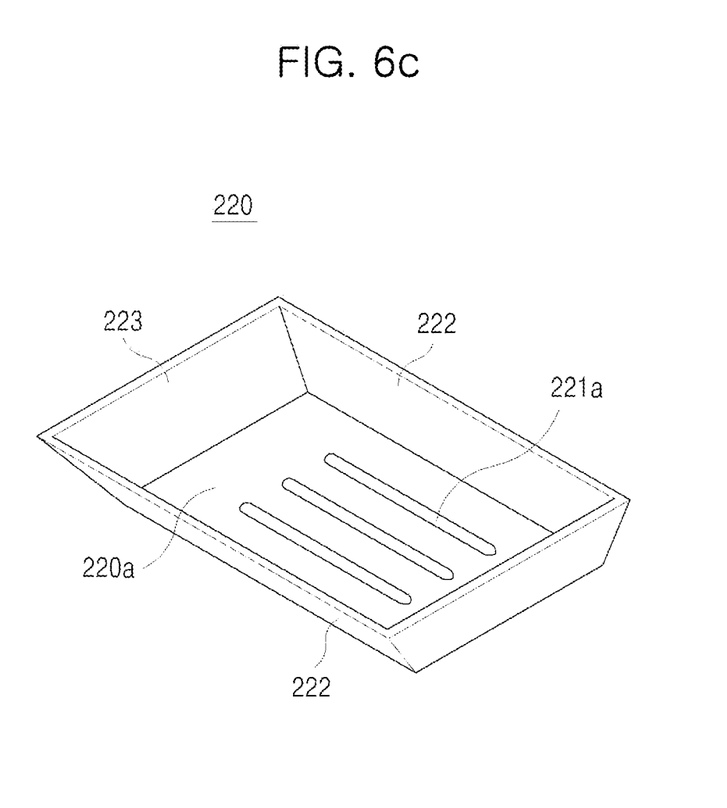
FIG. 6c is a view showing the guide portion ship according to an embodiment of the present invention.

Referring to FIGS. 6A and 6C, the pyrolysis furnace 200 is connected and installed with a plurality of guide parts 220 spaced apart from each other along the circumferential surface of the outlet, so that foreign substances and sludge are introduced into the sludge discharge pipe 500.

For this purpose, the guide part 220 has a plurality of linear protrusions 221a formed on the bottom plate 220a, so that foreign substances and sludge are not adhered to the bottom plate 220a, and separation is easy.

On both sides of the bottom plate 220a, the side plates 222 are formed so that the width gradually expands in the diagonal direction toward the ends, and the inclined plate 223 is formed in front of the bottom plate 220a and the side plates 222 on both sides. By being coupled and formed to gradually expand in the diagonal direction toward the end, As the pyrolysis furnace 200 rotates, foreign substances and sludge that are generated and rotated are guided to the inlet of the sludge discharge pipe 500 to enable smooth inflow.

An end of the guide unit 220 is formed to protrude more than the end of the sludge discharge pipe and is formed to protrude less than an end of the gas output pipe 400 so that foreign substances and sludge guided by the guide unit 220 are not transferred to the gas output pipe 400 but flowed into the sludge discharge pipe 500.

Figure 7:
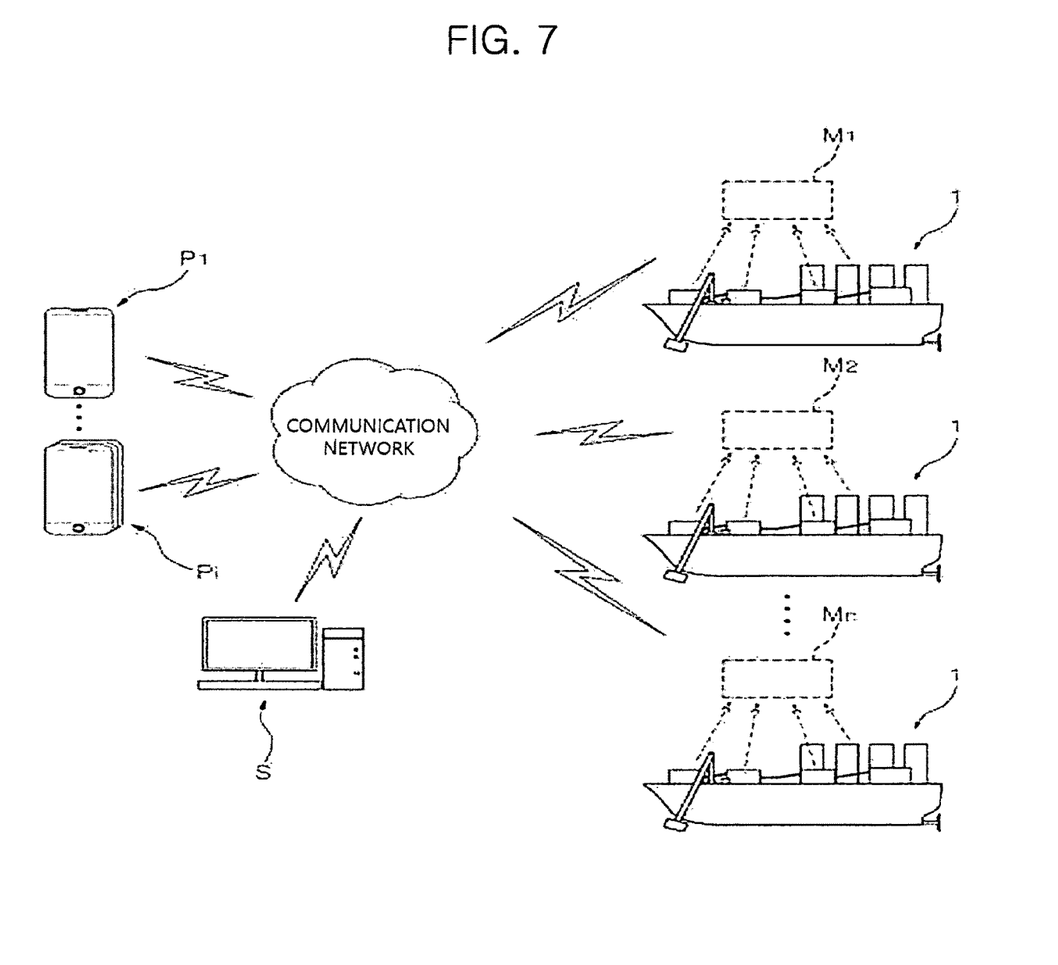
FIG. 7 is a configuration view illustrating a management system for ocean debris collecting and recycling process in which the ships according to an embodiment of the present invention.

Referring to FIG. 7, the multifunctional ship for collecting and recycling the ocean debris according to the present invention is provided with a navigation and traffic control device 11 for the navigation and control in the hull 1, and the navigation and traffic control device 11 may include an engine and a steering device, etc. for an autonomous or self-navigation.

In addition, monitoring device M1, M2 . . . Mn for monitoring and managing the processes of detecting ocean debris L, collecting, sorting, and processing the detected ocean debris L may be provided according to aspects of the present invention.

The navigation and traffic control device may monitor and manage the overall situation related to the collection and treatment of ocean debris L while communicating with the external control device S provided outside the hull 1 such as land or other ships.

For example, a traffic control device $M_1$, $M_2$, . . . , Mn provided in each of a plurality of ships, an external control device S located on land or other ships, and the monitoring terminals, P1, . . . , Pi, a portable type of terminal, carried by a manager operating on land or a ship are connected through a communication network.

The traffic control device $M_1$, $M_2$, . . . , Mn may collect, store, and transmit information to the external control device S, the information are related to a position and detection amount of ocean debris detected by the detector 2 of the ship, a collected location and collection amount of ocean debris collected by the collecting device 3, the recycled throughput of the ocean debris recycled by the waste plastic recycling device 6 and the waste wood recycling device 7, and a reproduction of the recycled oil and the production of wood chips.

The external control device S receives, stores, and analyzes information transmitted from each traffic control device M1, M2, . . . , Mn of a plurality of ships, it can be used to prepare and execute a plan to collect and process future ocean debris from the distribution of ocean debris, the collection and throughput of ocean debris currently being collected and processed, and the processing speed by analyzing and processing the information transmitted from it.

The information collected by the control device M1, M2, . . . , Mn and the information analyzed and processed by the external control unit S are transmitted to the portable monitoring terminals P1, . . . , Pi carried by the manager or worker through the communication network, so that the manager or operator can view the information and use it immediately for work.

In addition, embodiments of the disclosure disclosed herein may be implemented on a computer program product. More specifically, the computer program product is a product having a computer readable medium on which computer program logic is encoded, and when executed on a computing device, the computer program logic provides related operations to implement the above technical solution of the present disclosure. When executed on at least one processor of a computing system, the computer program logic causes the processor to perform the operations (methods) described in the embodiments of the present disclosure. The arrangement of the disclosure is typically provided as software, code, and/or other data structures provided or encoded on a computer-readable medium, such as an optical medium (e.g., CDROM), floppy disk or hard disk, etc., or firmware or microcode on at least one of ROM or RAM or PROM chip, or downloadable software images, shared databases, etc. in one or more modules. Software or firmware or such a configuration may be installed on a computing device such that one or more processors in the computing device perform the techniques described in the embodiments of the present disclosure.

Although the present invention has been described above in connection with preferred embodiments of the present disclosure, it will be apparent to those skilled in the art that various modifications, substitutions and changes can be made to the present disclosure without departing from the spirit and scope of the present invention. Therefore, the present invention should not be limited by the above-described embodiments but should be defined by the appended claims and their equivalents.

Industry Availability

According to the present invention, it is possible to solve the environmental problems that occur while transporting ocean debris to land, does not discharge waste to the ocean, collects and sorts of ocean debris detected with a detecting device, and removes waste plastic from the selected ocean debris since it is possible to produce recycled oil by pyrolysis. Thus, it has industrial applicability.

What is claimed is:

1. A multifunctional ship for collecting and recycling of ocean debris, comprising:
   a hull;
   a detector provided in the hull to detect ocean debris floating on a sea or deposited in a seabed during anchoring or sailing of the hull:
   a collecting device installed in the hull to collect the ocean debris detected by the detector to the hull;
   a sorting device installed in the hull to sort the ocean debris collected by the collecting device by at least one detected debris characteristic variation,
   a compressing device installed in the hull to compress the ocean debris sorted by the sorting device to remove moisture and reduce a volume of the ocean debris sorted by the sorting device;
   a pyrolysis furnace to pyrolyze the compressed waste plastic;
   a waste plastic recycling device, installed in the hull, which has the pyrolysis furnace therein to pyrolyze the compressed waste plastic from the compressing device into the pyrolysis furnace through an input pipe, discharge an oil vapor and a sludge from pyrolyzing the compressed waste plastic through a gas output pipe and a sludge discharge pipe, respectively, and produce a recycled oil from pyrolyzing the compressed waste plastic;
   a storage tank installed at a bottom of the hull configured to store the recycled oil produced by the waste plastic recycling device;
   a driver attached to the input pipe,
   wherein the input pipe comprises a pair of input screws inside of the pipe installed horizontally side by side to be rotated by the driver to compress and transport the waste plastic, and the pair of input screws have a plurality of slits therebetween so that some slits overlap each other while being spaced apart; and
   an air inlet preventing plate with a plurality of input holes through which the waste plastic compressed by the pair of input screws passes provided at a rear end of the input pipe in the vertical direction, while being spaced apart from an inlet of the pyrolysis furnace,
   wherein each of the plurality of the slits is formed in a wave shape and the slits are spaced apart by a first gap of 2 to 10 mm therebetween so that a waste vinyl is compressed and transported,
   wherein the pair of input screws and the air inlet preventing plate are spaced apart by a second gap,
   wherein the second gap is 2 to 10 cm, and a protective layer is applied to surfaces of the pair of input screws, and the protective layer includes 10 to 20 wt. % of glass fiber, 5 to 10 wt. % of carbon fiber, and 5 to 10 wt. % polymethyl methacrylate, and
   wherein the air inlet preventing plate has a circular shape having a predetermined thickness and has a plurality of input holes formed therethrough, a front coating layer s applied to the air inlet preventing plate, and a rear coating layer is applied to a rear surface of the air inlet preventing plate.

2. The multifunctional ship for ocean debris collection and recycling of claim 1, further comprising a waste wood recycling device installed in the hull to dry and to crush a compressed waste wood in the compressing device to produce wood chips.

3. The multifunctional ship for collecting and recycling of the ocean debris of claim 1, further comprising:
   a controller;
   a dropper provided in the hull; and
   a camera attached to the dropper or mounted on an underwater drone; wherein the detector acquires image information by photographing the sea, underwater or the seabed with the camera, and provides location information of the ocean debris confirmed from the acquired image information, and the camera is configured to be put into the water by the dropper provided in the hull, or is mounted on an underwater drone that is controlled by the controller in communication with the hull and configured to be put into the water.

4. The multifunctional ship for collecting and recycling of ocean debris of claim 1, wherein the collecting device is installed at a head of the hull to pick up ocean debris floating on a sea and the collecting device further comprises:
   first collecting crane and a second collecting crane,
   a collecting conveyor, which has a lower part and an upper part wherein a lower part of the collecting conveyer is configured to be put into the water and an upper part of the collecting conveyer is configured to be extended to over the hull, and
   an inhaler disposed at a front or a side of the hull to inhale the ocean debris floating on the sea, or deposited on a seabed to discharge the ocean debris on board the hull,
   wherein the first collecting crane and the second collecting crane are installed on both sides of the hull, respectively, and comprise a clamp or bucket under the hull to pick up ocean debris floating in the sea and lift the ocean debris up onto the hull.

5. The multifunctional ship for collecting and recycling of ocean debris of claim 1, further comprising:
   a power generator configured to produce electricity from heat generated while processing the ocean debris, and to supply the electricity to the waste plastic recycling device.

6. A multifunctional ship management system for collecting and recycling of ocean debris, comprising:
   a plurality of multifunctional ships for collecting and recycling of ocean debris as characterized by claim 1,
   wherein each hull of the plurality of multifunctional ships is equipped with a navigation control device for navigation and control, and the navigation control device is equipped with an engine and a steering device to collect an ocean debris based on the location information of the ocean debris detected by a detector and navigate the hull to a target position, and
   each of the ships comprises a traffic control device to monitor operation of the collecting, sorting, compressing, and recycling devices and of the storage tank, and collect and store information on any one of a location, collected amount, sorting amount, recycled amount, and stored amount of the ocean debris, and to transmit the information to an external control device provided outside the ships,
   wherein the external control device receives the information transmitted from the traffic control device of each ship, stores, and analyzes the information, and establishes a plan for collecting, distributing, and treating the ocean debris, and transmits the analyzed information and plan by a communication network to a portable monitoring terminal.

7. A multifunctional ship for collecting and recycling of ocean debris, comprising:
a hull:
a detector provided in the hull configured to detect ocean debris floating on a sea or deposited on a seabed during anchoring or sailing of the hull;
a collecting device installed in the hull configured to collect the ocean debris detected by the detector to the hull:
a sorting device installed in the hull configured to sort the ocean debris collected by the collecting device by at least one detected debris characteristic variation;
a compressing device installed in the hull configured to compress a waste plastic sorted from the ocean debris by the sorting device, to remove moisture, and to reduce a volume of the ocean debris;
a pyrolysis furnace to pyrolyze the compressed waste plastic;
a waste plastic recycling device installed in the hull and configured to pyrolyze the compressed waste plastic from the compressing device into the pyrolysis furnace through an input pipe, discharge oil vapor and sludge through a gas output pipe and a sludge discharge pipe, respectively, and produce a recycled oil from pyrolyzing the compressed waste plastic;
a storage tank installed at a bottom of the hull to store the recycled oil produced by the waste plastic recycling device;
a purification device configured to purify a wastewater generated in during the producing of recycled oil for recycling;
a discharge pipe body connected to the outlet of the pyrolysis furnace, a horizontal axis of the gas output pipe and the sludge discharge pipe each passing through the inside of the discharge pipe body;
a blocking plate formed to close an inlet of the discharge pipe body for blocking heat of the pyrolysis furnace from being transmitted to the gas output pipe and the sludge discharge pipe, wherein the blocking plate has an opening so that the inlet of the gas output pipe and the sludge discharge pipe communicate with the pyrolysis furnace;
a reverse-rotating screw rotatably installed along the horizontal axis of the gas outlet pipe; and,
a first driver is attached to the reverse-rotating screw to rotate the reverse-rotating screw,
wherein a pipe inlet of the discharge pipe body is exposed to the outside of the discharge pipe body and protrudes to enter the pyrolysis furnace, and comprises an inclined part is formed to minimize an inflow of sludge, and a forward rotation screw is rotatably installed inside the discharge pipe body by a second driver attached thereof;
wherein an air inlet preventing plate with a plurality of input holes through which the waste plastic compressed by the pair of input screws is provided at a rear end of the input pipe in the vertical direction, at an inlet end of the pyrolysis furnace, while being spaced apart from an inlet of the pyrolysis furnace;
wherein a horizontal lie axis of the sludge discharge pipe has a semi-elliptical shape with a vertical cross section so that inflow and discharge of sludge is made smoothly,
wherein the forward rotation screw includes a plurality of blades in which a pitch between the blades is formed to be 1.5 to 3 times a pitch of the reverse-rotating screw, and the pitch gradually increases toward the rear end thereof, and
wherein a shaft part with no blades is formed at a rear end of the sludge discharge pipe in which the orientation of the sludge discharge pipe changes to downward.

8. The multifunctional ship for ocean debris collection and recycling of claim 7, further comprising a waste wood recycling device installed in the hull to dry and to crush a compressed waste wood in the compressing device to produce wood chips.

9. The multifunctional ship for collecting and recycling of ocean debris of claim 7, further comprising:
a camera attached to the detector and configured to photograph the sea or the seabed.

10. The multifunctional ship for collecting and recycling of ocean debris of claim 7,
wherein the collecting device comprises:
a collection conveyor, which has a lower part configured to be put into the water and an upper part configured to be extended over the hull, a first crane and second crane installed on both sides of the hull, respectively, and an inhaler disposed at the front or side of the hull to inhale the ocean debris floating in the sea or deposited on the seabed and to discharge the ocean debris onto the hull.

11. The multifunctional ship for collecting and recycling of ocean debris of claim 7, further comprising:
a power generator configured to produce electricity from heat generated while processing the ocean debris, and to supply the electricity to the waste plastic recycling device.

12. A multifunctional ship management system for collecting and recycling of ocean debris, comprising:
a plurality of multifunctional ships for collecting and recycling of ocean debris as characterized by claim 7,
wherein the hull of each ship is equipped with a navigation control device for navigation and control, and the navigation control device is equipped with an engine and a steering device to collect an ocean debris based on the location information of the ocean debris detected by the detector and navigate the hull to a target position, and
each of the ships comprises a traffic control device to monitor operation of the collecting, sorting, compressing, and recycling devices and of the storage tank, and collect and store information on any one of a location, collected amount, sorting amount, recycled amount, and stored amount of the ocean debris, and to transmit the information to an external control device provided outside the ships,
wherein the controller receives an information transmitted from the traffic control device of each ship, stores, and analyzes the information, and establishes a plan for collecting, distributing, and treating the ocean debris, and transmits the analyzed information and plan by a communication network to a portable monitoring terminal.

* * * * *